United States Patent
Buron et al.

(10) Patent No.: US 9,051,984 B2
(45) Date of Patent: Jun. 9, 2015

(54) ENERGY ABSORPTION DEVICE WITH FIBERS EMBEDDED IN A PLASTIC MATERIAL, AND ASSOCIATED FRONT FACE

(75) Inventors: Marie-Pierre Buron, Montenois (FR); Philippe Compagnon, Valentigney (FR); Abla Steinmetz, Herimoncourt (FR); Vincent Gonin, Saint Cyr sur Loire (FR)

(73) Assignee: Faurecia Bloc Avant, Nanterre (FR)

( * ) Notice: Subject to any disclaimer, the term of this patent is extended or adjusted under 35 U.S.C. 154(b) by 125 days.

(21) Appl. No.: 13/988,934

(22) PCT Filed: Nov. 21, 2011

(86) PCT No.: PCT/FR2011/052711
§ 371 (c)(1),
(2), (4) Date: Jun. 28, 2013

(87) PCT Pub. No.: WO2012/069746
PCT Pub. Date: May 31, 2012

(65) Prior Publication Data
US 2014/0042758 A1 Feb. 13, 2014

(30) Foreign Application Priority Data

Nov. 22, 2010 (FR) ...................................... 10 59581

(51) Int. Cl.
| | |
|---|---|
| *B60R 19/03* | (2006.01) |
| *B60R 19/34* | (2006.01) |
| *F16F 7/12* | (2006.01) |
| *B62D 21/15* | (2006.01) |
| *B62D 25/08* | (2006.01) |
| *B62D 29/00* | (2006.01) |
| *F16F 7/00* | (2006.01) |

(52) U.S. Cl.
CPC ................. *F16F 7/121* (2013.01); *B60R 19/03* (2013.01); *B60R 19/34* (2013.01); *B62D 21/152* (2013.01); *B62D 25/085* (2013.01); *B62D 29/005* (2013.01); *F16F 7/124* (2013.01); *F16F 7/003* (2013.01)

(58) Field of Classification Search
CPC ............................... B60R 19/03; B60R 19/34
USPC ........... 296/187.03, 187.09–187.11; 293/132, 293/133; 188/371–377
See application file for complete search history.

(56) References Cited

U.S. PATENT DOCUMENTS 4,742,899 A * 5/1988 Thornton ....................... 188/377
5,732,801 A * 3/1998 Gertz ............................ 188/377

(Continued)

FOREIGN PATENT DOCUMENTS

DE 19931981 A1 12/1999
EP 1617098 A2 1/2006

(Continued)

*Primary Examiner* — Gregory Blankenship
(74) *Attorney, Agent, or Firm* — Thompson Coburn LLP; Steven M. Ritchey

(57) ABSTRACT

The invention relates to an energy absorption device for a motor vehicle, said device comprising a structure provided so as to plastically deform under the effect of an impact of a given energy, the structure being made of a matrix of a ductile plastic material and high-tenacity fibers embedded in the matrix, the majority of the fibers having a length of between 0.1 and 10 mm, and the material comprising between 2 and 10 wt % of high-tenacity fibers.

15 Claims, 4 Drawing Sheets

(56) References Cited

U.S. PATENT DOCUMENTS

| | | | |
|---|---|---|---|
| 6,296,301 B1* | 10/2001 | Schroeder et al. | 296/187.02 |
| 6,644,722 B2* | 11/2003 | Cooper | 296/187.02 |
| 6,860,539 B2* | 3/2005 | Watanabe et al. | 296/93 |
| 8,864,216 B2* | 10/2014 | Nagwanshi et al. | 296/187.03 |
| 2010/0032970 A1* | 2/2010 | Nishiguchi et al. | 293/132 |
| 2010/0102577 A1* | 4/2010 | Ginja et al. | 293/102 |
| 2010/0320780 A1* | 12/2010 | Glynn | 293/132 |
| 2012/0153647 A1* | 6/2012 | Nagwanshi et al. | 293/132 |
| 2012/0153669 A1* | 6/2012 | Nagwanshi et al. | 296/187.08 |
| 2014/0042758 A1* | 2/2014 | Buron et al. | 293/133 |

FOREIGN PATENT DOCUMENTS

| | | |
|---|---|---|
| FR | 2911831 A1 | 8/2008 |
| FR | 2919566 A1 | 2/2009 |
| FR | 2927033 A1 | 8/2009 |
| GB | 1391780 A | 4/1975 |
| GB | 2437499 A | 10/2007 |
| WO | 2007/011238 A1 | 1/2007 |

* cited by examiner

ENERGY ABSORPTION DEVICE WITH FIBERS EMBEDDED IN A PLASTIC MATERIAL, AND ASSOCIATED FRONT FACE

The present invention generally relates to energy absorption devices for motor vehicles.

Energy absorption devices are for example known for medium-intensity impacts of the Danner type. These energy absorbers are typically inserted between the front face of the vehicle and the main beams, or between the front face and the lower beams of the vehicle. The lower beams are also referred to as a "cradle projection."

Such impact absorbers are typically made up of metal boxes preloaded to deform plastically in the event of impacts with an intensity higher than a predetermined energy, by absorbing part of the energy of the impact. Such absorbers are for example described in FR 0756932. The force causing the plastic deformation of the energy absorber, also called taring of the energy absorber, must be as high as possible to allow an effective dissipation of the energy and reduced bulk. It must therefore be greater than a lower bound Fmini.

This force must also be below the taring of the main beams or the lower beams, so as not cause a permanent deformation of the beams in case of impacts. Thus, the taring must be below an upper bound Fmaxi.

It is imperative for the taring of the energy absorbing device to be very close to Fmaxi by the lower value. In practice, the difference between Fmini and Fmaxi is approximately 20%, the energy absorption device having to be within that range.

Furthermore, it is known that the taring of an energy absorption device may vary with the ambient temperature. The specifications imposed by automobile builders typically require that the taring of the energy absorption devices be within the aforementioned range for the entire temperature range from −30° C. to +80° C.

Impact absorption devices of the metal box type generally have good temperature stability. However, they have a high mass and complex structure, since they generally include several parts assembled together: a bearing plate, an aluminum foam block or metal box, a deformable enclosure inside which the metal foam block or metal box is inserted, etc. As a result, these absorbers are expensive, due to the fact that their assembly requires considerable time and involves a large number of parts.

In this context, the invention aims to propose an impact absorption device that is simpler and less expensive, but with temperature-stable performance.

To that end, according to a first aspect, the invention relates to an energy absorption device comprising a structure provided so as to plastically deform under the effect of an impact of given energy, absorbing part of the energy of the impact, the structure being made of a material comprising:
- a matrix of a ductile plastic material;
- high-tenacity fibers embedded in the matrix, the majority of the fibers having a length of between 0.1 and 10 mm, and the material comprising between 2 and 10 wt % of high-tenacity fibers.

The device may also have one or more of the features below, considered individually or according to any technically possible combinations:
- the material comprises between 5 and 9 wt % of high-tenacity fibers;
- the high-tenacity fibers are glass, carbon or aramid fibers;
- the matrix is a styrenic polymer, or polycarbonate, or polyamide, or saturated polyester, or polyolefin, or elastomer, or an alloy of one or more of the aforementioned materials;
- the majority of the fibers have a length comprised between 0.1 and 7 mm; and
- the structure is a cellular structure, comprising a plurality of walls together defining hollow cells that are juxtaposed relative to one another.

According to a second aspect, the invention relates to a front face of an automobile, the front face comprising a rigid crosspiece having side portions positioned in the longitudinal extension of the beams of the vehicle, and at least one energy absorption device having the above features, inserted longitudinally between one of the beams and one of the side portions of the crosspiece.

According to a third aspect, the invention relates to a motor vehicle front face, the front face comprising a rigid frame including:
- an upper transverse crosspiece;
- a lower transverse crosspiece;
- vertical legs connecting the upper and lower crosspieces to one another and provided to bear on the beams of the vehicle, at least one of the vertical legs constituting an energy absorption structure having the aforementioned features.

The front face may also have one or more of the features below, considered individually or according to any technically possible combinations:
- the rigid frame is made by injection;
- the upper and lower crosspieces are made from a first material including a matrix made from a first plastic material, the legs being made from a second material different from the first material and including a matrix made up of the first plastic material;
- the upper and lower crosspieces are made from a first material including a matrix made from a first plastic material and an elastomer, or an impact copolymer; and
- the upper and lower crosspieces are made from a first material including a matrix made from a first plastic material, the legs being made from a second material different from the first material and including a matrix made up of a second plastic material that is different from the first, the first and second materials comprising a chemical coupling additive for the first and second plastic materials, provided to strengthen the connection of the legs with the upper and lower crosspieces.

Other features and advantages of the invention will emerge from the detailed description thereof provided below, for information and non-limitingly, in reference to the appended figures, in which.

In the following description, the longitudinal, transverse, front and back directions are to be understood with respect to the normal direction of movement of the vehicle.

Figure 1:
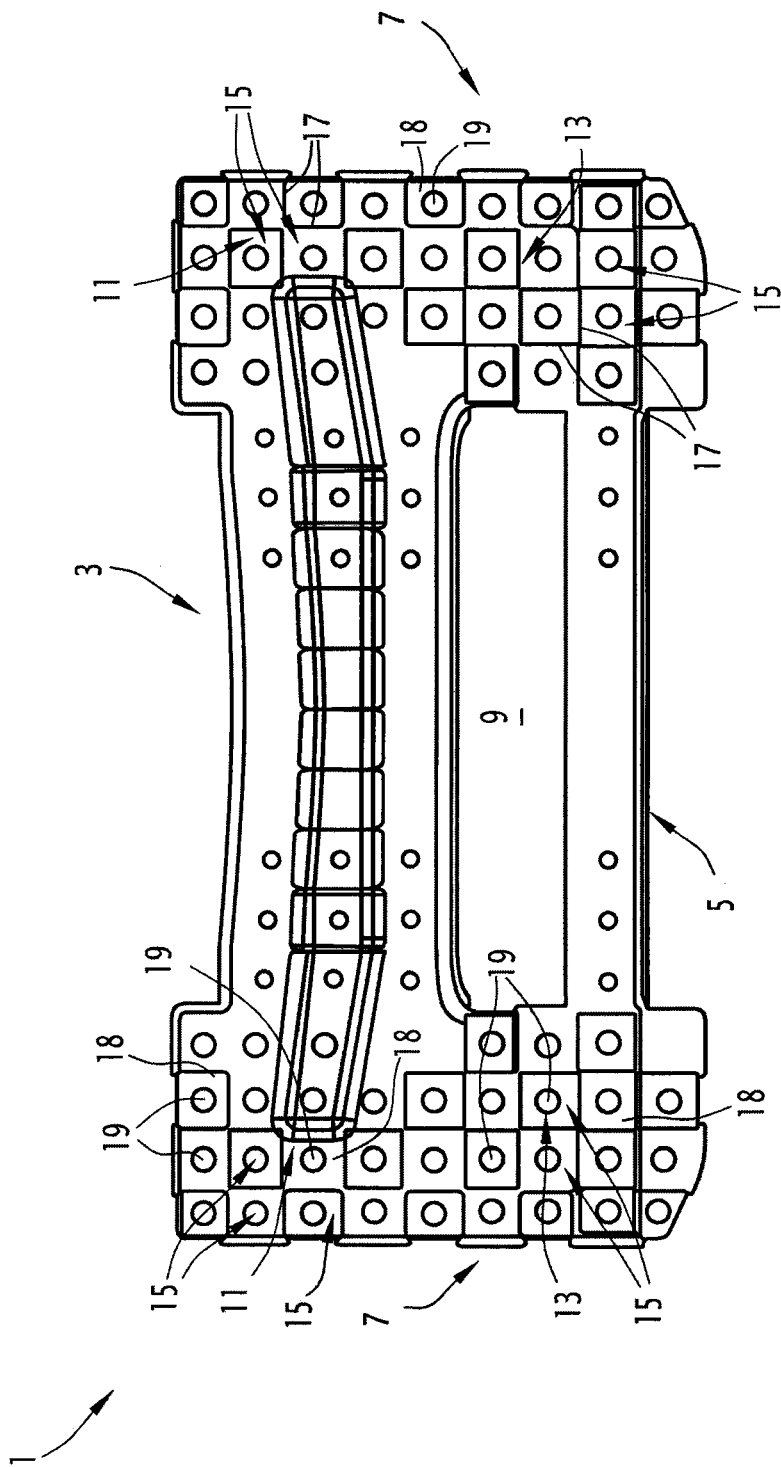
FIG. 1 is a front view of a rigid frame including several energy absorption devices according to the invention, the rigid frame being provided to be integrated into a front face of a motor vehicle.

The frame 1 shown in FIG. 1 is designed to be integrated substantially vertically into a motor vehicle front face. It includes an upper transverse crosspiece 3, a lower transverse crosspiece 5, and two legs 7, provided to be positioned substantially vertically. Each leg 7 connects one end of the upper transverse crosspiece 3 to the corresponding end of the lower transverse crosspiece 5.

The crosspieces and the legs define a central opening 9 between them.

The areas 11 of the frame 1, situated at the intersection of the upper crosspiece 3 and the legs 7, are designed to be placed substantially in the longitudinal extension of the main beams of the motor vehicle. The areas 13 situated substantially at the intersection of the lower crosspiece 5 and the legs 7 are designed to be placed in the longitudinal extension of the lower beams of the motor vehicle.

In this embodiment, each of the areas 11 and 13 constitutes an energy absorption device, tared for medium-intensity impacts (Danner impacts).

The areas 11 and 13 of the frame are made from a material including:
 a matrix made from a ductile plastic material;
 high-tenacity fibers embedded in the matrix, the majority of the fibers having a length of between 0.2 and 10 mm, the material comprising between 2 and 10 wt % of high-tenacity fibers.

A matrix here refers to the chemical or copolymer component making up the majority of the material. The other components are additives that are dispersed and embedded in the matrix. These additives may be large, such as the aforementioned fibers. The additives may also be chemical components dispersed and closely mixed in the form of very fine nodules or particles in the matrix.

In the present case, the majority of the matrix comprises a polyolefin, or polyamide, or a styrenic polymer, or polycarbonate, or saturated polyester, or elastomer. Typically, the matrix is made up of a polyolefin or a styrenic polymer or a polycarbonate or a polyamide or a saturated polyester or an elastomer. The polyolefin is typically a polypropylene or a propylene-ethylene copolymer, or a propylene-hexene copolymer, or a propylene-octene copolymer, or an ethylene-octene copolymer, or a propylene-ethylene-butene-terpolymer.

The high-tenacity fibers are typically glass fibers, carbon fibers, or aramid fibers.

The fibers are of the type known under the name "short fibers" or "long fibers." The short fibers typically have a length smaller than 1 mm. The majority of long fibers have a length comprised between 1 and 7 mm.

Preferably, the majority of the fibers have a length comprised between 0.5 and 5 mm. It should be noted that the length to which reference is made here corresponds to the length of the fibers making up the finished product. Some of the fibers break during plasticizing and injection of the material in the mold, at a high temperature.

As indicated above, the material comprises between 2 and 10 wt % of fibers, the rest being made up of the matrix in a plastic material, and optionally other additives. Also preferably, the material comprises between 5 and 9 wt % of fibers.

The areas 11 and 13 typically each have a cellular structure, including a plurality of hollow cells 15 that are juxtaposed relative to one another. The cells 15 are defined by walls 17, which may if applicable be shared by several cells. The walls are made up of the aforementioned material.

The cells 15 are for example closed toward the front of the vehicle by a front partition 18, and open toward the rear of the vehicle. They are typically closed toward the top, bottom, right and left of the vehicle. In the example shown in FIG. 1, the front partition 18 includes an opening 19, to allow air to escape when the energy absorption device is crushed.

The cells 15, considered in sections perpendicular to the longitudinal direction, may assume all types of shapes. In the example of FIG. 1, they are substantially square or rectangular. They may also be hexagonal, triangular, circular, oval, etc.

Figure 2:
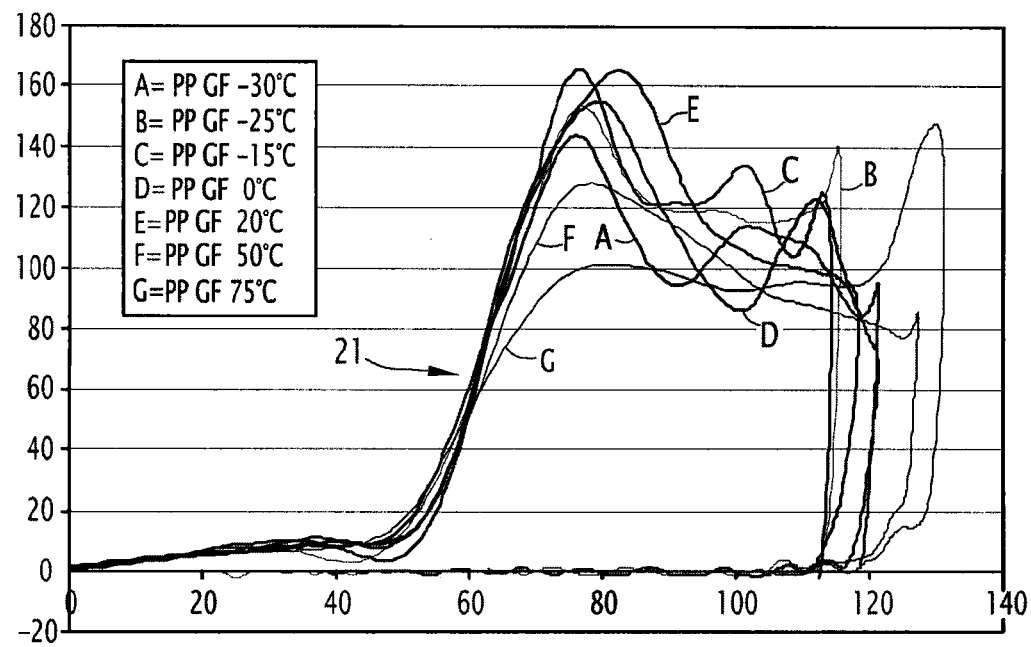
FIG. 2 is a graph showing the resistance force of each of the energy absorption devices of the frame of FIG. 1, as a function of the driving in, at different ambient temperatures.

FIG. 2 is a graph that shows the evolution of the resistance force to driving in (on the y-axis, expressed in kilonewtons kN), as a function of the deformation of the material under the effect of the movement of the impacting object (on the x-axis, expressed in millimeters), for each of the areas 11 and 13. FIG. 2 includes several curves, each curve corresponding to the behavior of the areas 11 or 13 at a different ambient temperature. These curves have been done for energy absorption devices with a propylene-ethylene copolymer matrix, 7.5% filled with long glass fibers.

As shown in FIG. 2, all of the curves include a first segment with a small incline between 0 and 50 mm, followed by a sharply inclined portion 21, close to the vertical. The slightly inclined segment corresponds to a moment when the object impacting the front face has not yet reached the rigid structures of the front face. When that object reaches the frame, the resistance force increases abruptly, which corresponds to the portion 21. When the object hits the front face with a force greater than the taring of the areas making up the energy absorption device, those areas deform gradually, such that the resistance force of said areas decreases. In FIG. 2, the height of the portion 21 corresponds to the taring of the energy absorption device.

Between −30° and 20° C., the taring remains comprised between 150 kN and 170 kN. No peak greater than approximately 170 kN is observed, such that the body of the vehicle, in particular the upper and lower beams, is completely protected. These high values also allow effective energy absorption. Between 50 and 80° C., the absorber becomes a bit more flexible, while preserving a taring above 100 kN. The body structure is always fully protected, and the energy is sufficiently absorbed.

Thus, the impact absorption devices described above have a remarkably homogenous behavior with respect to the ambient temperature.

This is due to the fact that the addition of a reduced quantity of fibers causes a particular behavior of the impact absorption device. At low temperatures, and ambient temperature, the matrix breaks very gradually, in a fragile mode. The material undergoes a very gradual separation, from the front or the back of the vehicle, without an abrupt rupture of the absorber. Such a deformation mode allows a very effective dissipation of the energy, and makes it possible to obtain temperature-stable taring, only slightly below the nominal taring of the beams. At high temperatures, the taring decreases slightly, but in proportions smaller than those of the polymer material making up the matrix.

Figure 3:
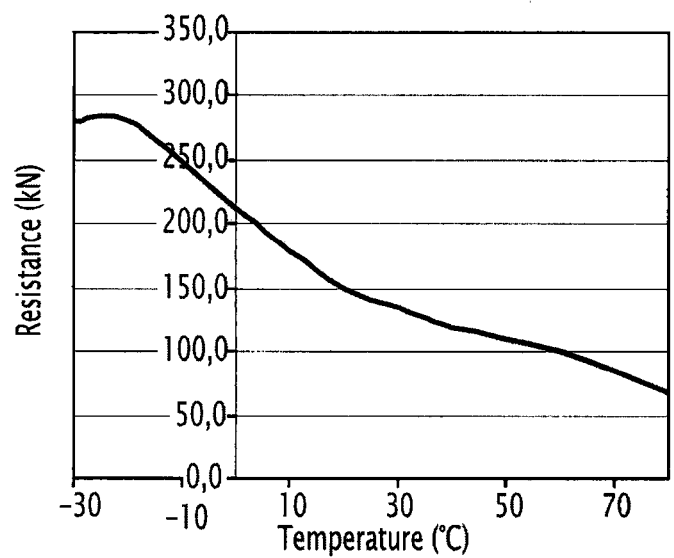
FIG. 3 is a graph showing the evolution of the taring of an energy absorption device made from a copolymer polypropylene not according to the invention, as a function of the temperature.
Figure 4:
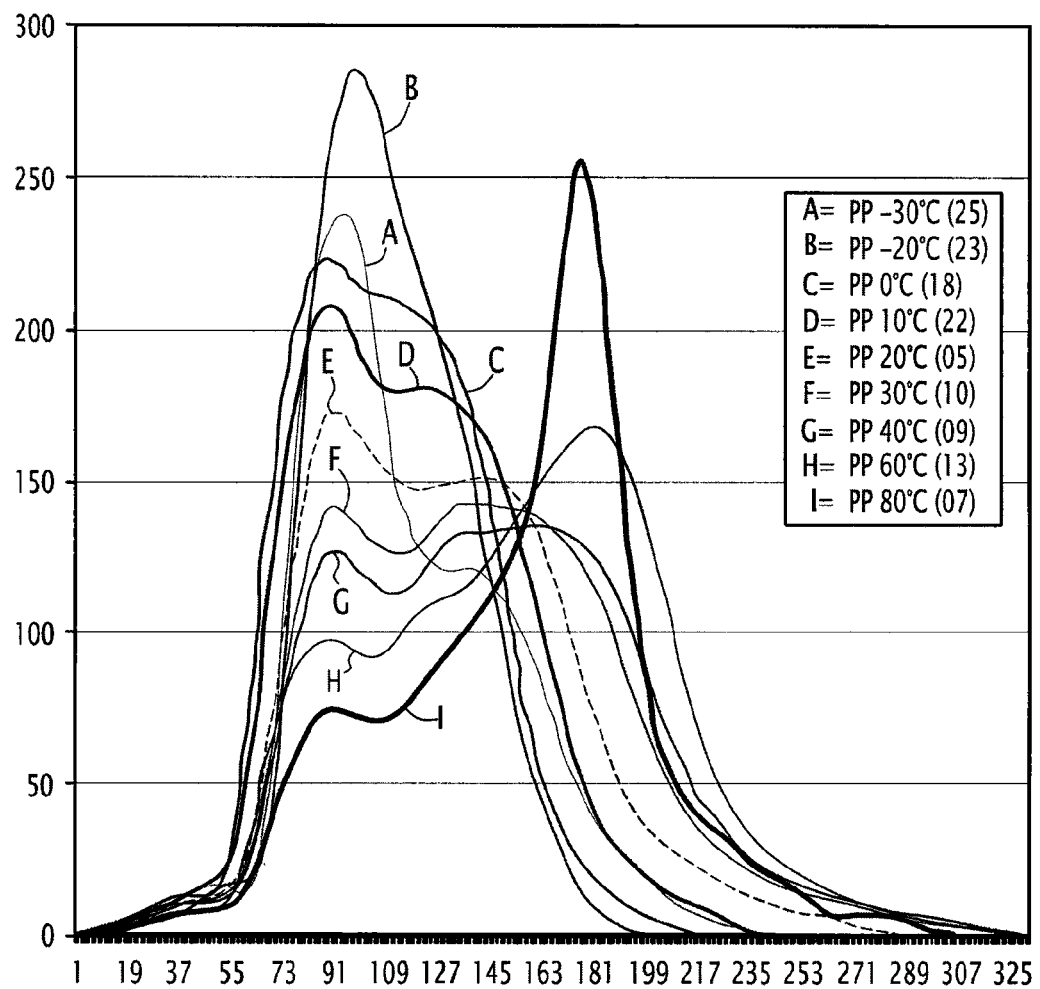
FIG. 4 is a graph similar to that of FIG. 2, for an impact absorption device made from polypropylene not according to the invention.

In fact, as shown in FIG. 3, an energy absorber having the same structure as that of the areas 11 and 13 of FIG. 1, tared to offer a strength of approximately 150 kN at ambient temperature, offers a crushing resistance that varies significantly as a function of the temperature. The curve of FIG. 3 was prepared for a polypropylene absorber. The taring decreases regularly with the temperature. At 80° C., this taring is only 70 kN, which is insufficient to absorb the energy resulting from an impact. The object impacting the front face then risks colliding with the structure of the body and causing irreversible damage thereto. On the contrary, at −20° C., the energy absorption device is much too rigid (taring of approximately 280 kN). The taring of the energy absorption device becomes greater than the taring of the beams, such that said beams will deform before the energy absorbers.

The deformation mode of the energy absorption devices according to the invention is different from that of the energy absorption devices made from a non-filled ductile polymer. The latter deform by buckling, and more specifically by bundling. In this deformation mode, the structure forms folds, like a plastic bottle being crushed.

It should be noted that impact absorption devices made from a material including a matrix in a ductile plastic material and a high concentration of high-tenacity fibers, for example more than 15% of high-tenacity fibers, do not offer satisfactory behavior. The material breaks extremely easily at low and medium temperatures, in particular between −30 and +20° C. The material is then no longer able to dissipate the energy effectively: it collapses abruptly and breaks down into several pieces.

In the example embodiment of FIG. 1, the lower and upper crosspieces may advantageously be made from a different material from that of the legs. In fact, the specifications for the crosspieces are different from those of the energy absorption devices. The upper and lower crosspieces are designed to absorb the energy over the entire speed range of the vehicle and to oppose intrusion while preserving the integrity of the structure.

In one example embodiment, the lower and upper crosspieces are made from a material including a matrix identical to that of the legs 7, and an elastomer, for example EPDM.

In that case, the frame may advantageously be integral. It is for example obtained by bi-injection or co-injection of the legs and the crosspieces in a same mold. Bi-injection refers to injection done in a mold including different injection orifices, each dedicated to one of the materials to be injected. Co-injection refers to injection in a mold including a single injection orifice, the two materials being injected into the mold one after the other.

In another example embodiment, the upper and lower crosspieces may be made from a first material including a matrix in a first plastic material, the legs being made from a second material different from the first material, and including a matrix made up of a second plastic material different from the first plastic material. In that case, it is advantageous for the first and second materials each to comprise a chemical coupling additive for the first and second plastic materials, provided to strengthen the connection of the legs with the upper and lower crosspieces. For example, the first plastic material may be polyamide, and the second plastic material may be polypropylene, or vice versa. Additives are known making it possible to chemically couple these plastic materials.

In any case, the frame obtained is made by injection. This makes it possible to integrate functional areas in the frame easily such as under-projector supports, a technical front face, areas forming a structural carrier for face bar skin or an accessory such as fog lights, grills, drive wheels, etc.

Alternatively, it is possible to inject the legs and the upper and lower crosspieces separately, and then secure them to each other. It is also possible to provide plastic or metal beams in the frame forming a framework on which the legs and the upper and lower crosspieces are then injected.

Figure 5:
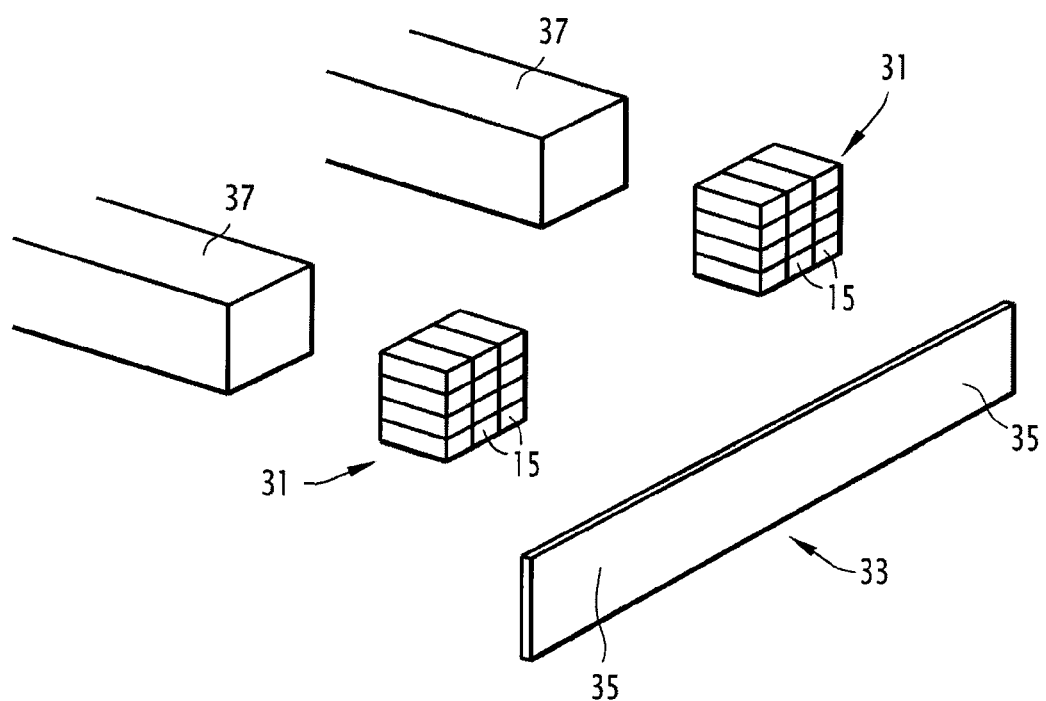
FIG. 5 shows energy absorption devices and certain elements of a front face according to a second embodiment of the invention.

In the embodiment of FIG. 5, the energy absorption devices 31 are not integrated into a frame of the front face.

The front face for example in this case includes one crosspiece 33, for example made from metal, the energy absorption devices 31 being inserted between two side parts 35 of the crosspiece 33, and the beams 37 of the vehicle. Each of the energy absorption devices 31 is a cellular structure of the aforementioned type, made up of a material with a ductile plastic matrix and high-tenacity fibers.

For example, each device includes four rows of three cells. The front face may in particular include platens, not shown in FIG. 5, each fastened by a first large face to a beam 37, the energy absorption device being rigidly fastened to a second large face of said platen. The beams 37 may be primary beams of the vehicle. They may also be the lower beams of the vehicle.

The energy absorption device as described above, and the front faces integrating such energy absorption devices, have multiple advantages.

The energy absorption devices have a reduced mass, since they are completely made from a filled plastic material. They are easy to design, and comprise a smaller number of parts (one part per energy absorption device). They may be obtained easily, for example by injection.

The front faces integrating these energy absorption devices, in particular when they comprise a frame of the type described relative to FIG. 1, are particularly easy to manufacture and assemble. It is in particular possible to integrate multiple functional areas on such frames.

The energy absorption devices have a remarkably temperature-stable taring.

The energy absorption devices were described above to absorb medium-intensity impacts; however, they may be tared to absorb the energy of lower or higher intensity impacts.

These energy absorption devices may be used not only in a motor vehicle front face, but also in the rear are or any other area of the vehicle where it is necessary to absorb a calibrated energy.

In the embodiment of FIG. 1, the legs 7 may be completely made from the material suitable for the areas forming the energy absorption devices 11 and 13. Alternatively, the legs 7 may include areas made up of material suitable for the areas 11 and 13, and other areas made up of another material, for example the material making up the crosspieces 3 and 5.

The energy absorption devices according to the invention have been described relative to FIG. 1 as making up areas of the frame with two crosspieces and two legs.

These devices may constitute frame areas with all sorts of shapes, only including a single crosspiece, or more than two crosspieces, or having any other shape.

Likewise, the energy absorption devices were described relative to FIG. 5 as being blocks integrated between a metal crosspiece and the beams of the vehicle. These blocks may be integrated into front faces with different compositions.

The invention claimed is:

1. An energy absorption device for a motor vehicle, the energy absorption device (11, 13, 31) comprising a structure provided so as to plastically deform under the effect of an impact of given energy thereby absorbing part of the energy of the impact, the structure being made of a material that comprises:
   a matrix of a ductile plastic material; and
   high-tenacity fibers embedded in the matrix, wherein the majority of the fibers having a length of between 0.1 and 10 mm, and the fibers at an amount that is between 2 and 10 wt % of the material forming the structure.

2. The device according to claim 1, characterized in that the material forming the structure comprises between 5 and 9 wt % of high-tenacity fibers.

3. The device according to claim 1, characterized in that the high-tenacity fibers are glass, carbon, or aramid fibers.

4. The device according to claim 1, characterized in that the matrix is selected from the group consisting of a styrenic polymer, polycarbonate, polyamide, saturated polyester, polyolefin, elastomer, and a combination thereof.

5. The device according to claim 1, characterized in that the majority of the fibers have a length comprised between 0.1 and 7 mm.

6. The device according to claim 1, characterized in that the structure is a cellular structure, and further comprises a plurality of walls (17) together defining hollow cells (15) that are juxtaposed relative to one another.

7. A front face of an automobile, the front face comprising:
a rigid crosspiece (33) having side portions (35) positioned in the longitudinal extension of beams (37) of the automobile; and
at least one energy absorption device (31) inserted longitudinally between one of the beams (37) and one of the side portions (35) of the crosspiece (33), wherein the absorption device (31) comprises a structure provided so as to plastically deform under the effect of an impact of given energy thereby absorbing part of the energy of the impact, the structure being made of a material that comprises:
a matrix of a ductile plastic material; and
high-tenacity fibers embedded in the matrix, wherein the majority of the fibers having a length of between 0.1 and 10 mm, and the fibers at an amount that is between 2 and 10 wt % of the material forming the structure.

8. The front face of an automobile according to claim 7, characterized in that the material forming the structure comprises between 5 and 9 wt % of high-tenacity fibers, the majority of the fibers have a length comprised between 0.1 and 7 mm, the high-tenacity fibers are glass, carbon, or aramid fibers, and the matrix is selected from the group consisting of a styrenic polymer, polycarbonate, polyamide, saturated polyester, polyolefin, elastomer, and a combination thereof.

9. The front face of an automobile according to claim 7, characterized in that the structure is a cellular structure, and further comprises a plurality of walls (17) together defining hollow cells (15) that are juxtaposed relative to one another.

10. A motor vehicle front face comprising a rigid frame (1) that comprises:
an upper transverse crosspiece (3);
a lower transverse crosspiece (5); and
vertical legs (7) connecting the upper and lower crosspieces (3, 5) to one another and provided to bear on beams of the vehicle, wherein at least one of the vertical legs (7) is an energy absorption device (11, 13) that comprises a structure provided so as to plastically deform under the effect of an impact of given energy thereby absorbing part of the energy of the impact, the structure being made of a material that comprises:
a matrix of a ductile plastic material; and
high-tenacity fibers embedded in the matrix, wherein the majority of the fibers having a length of between 0.1 and 10 mm, and the fibers at an amount that is between 2 and 10 wt % of the material forming the structure.

11. The motor vehicle front face according to claim 10, characterized in that the upper and lower crosspieces (3, 5) are made from a first material including a matrix made from a first plastic material, the legs (7) being made from a second material different from the first material and including a matrix made up of the first plastic material.

12. The motor vehicle front face according to claim 11, characterized in that the upper and lower crosspieces (3, 5) are made from a first material including a matrix made from a first plastic material and an elastomer, or an impact copolymer.

13. The motor vehicle front face according to claim 10, characterized in that the upper and lower crosspieces (3, 5) are made from a first material including a matrix made from a first plastic material, the legs (7) being made from a second material different from the first material and including a matrix made up of a second plastic material that is different from the first, the first and second materials comprising a chemical coupling additive for the first and second plastic materials, provided to strengthen the connection of the legs (7) with the upper and lower crosspieces (3, 5).

14. The motor vehicle front face according to claim 10, characterized in that the material comprises between 5 and 9 wt % of high-tenacity fibers, the majority of the fibers have a length comprised between 0.1 and 7 mm, the high-tenacity fibers are glass, carbon, or aramid fibers, and the matrix is selected from the group consisting of a styrenic polymer, polycarbonate, polyamide, saturated polyester, polyolefin, elastomer, and a combination thereof.

15. The motor vehicle front face according to claim 10, characterized in that the structure is a cellular structure, and further comprises a plurality of walls (17) together defining hollow cells (15) that are juxtaposed relative to one another.

* * * * *